United States Patent
Suzuki et al.

(10) Patent No.: US 7,622,042 B2
(45) Date of Patent: Nov. 24, 2009

(54) WATER TREATMENT APPARATUS AND METHOD

(75) Inventors: Eiichi Suzuki, Aichi (JP); Yukio Doi, Aichi (JP); Hayato Kurokawa, Aichi (JP); Yosuke Tabata, Aichi (JP); Toshiyuki Iwama, Aichi (JP)

(73) Assignee: Fuji Clean Co., Ltd., Nagoya-shi, Aichi (JP)

( * ) Notice: Subject to any disclaimer, the term of this patent is extended or adjusted under 35 U.S.C. 154(b) by 0 days.

(21) Appl. No.: 12/289,164

(22) Filed: Oct. 22, 2008

(65) Prior Publication Data

US 2009/0057211 A1    Mar. 5, 2009

Related U.S. Application Data

(63) Continuation of application No. 11/594,970, filed on Nov. 9, 2006, now Pat. No. 7,455,775.

(30) Foreign Application Priority Data

Nov. 10, 2005  (JP) .................. 2005-326645

(51) Int. Cl.
*C02F 3/00* (2006.01)
(52) U.S. Cl. ............. 210/631; 210/764; 210/150; 210/220; 134/104.1
(58) Field of Classification Search ............. 210/150, 210/151, 220, 232, 631, 764; 134/104.1
See application file for complete search history.

(56) References Cited

U.S. PATENT DOCUMENTS

| | | | | |
|---|---|---|---|---|
| 4,307,741 A | * | 12/1981 | Rossi | 134/100.1 |
| 4,517,849 A | * | 5/1985 | Nakahori et al. | 73/863.31 |
| 6,006,612 A | * | 12/1999 | Nurse et al. | 73/863.23 |
| 6,217,410 B1 | * | 4/2001 | Holzapfel et al. | 451/6 |
| 7,300,630 B2 | * | 11/2007 | Cronin et al. | 422/82 |

FOREIGN PATENT DOCUMENTS

JP            03052696 A       3/1991

* cited by examiner

*Primary Examiner*—Chester T Barry
(74) *Attorney, Agent, or Firm*—Dennison, Schultz & MacDonald

(57) ABSTRACT

It is an object of the invention to provide an effective technique for detecting the quality of water with high accuracy. A representative water treatment apparatus includes an aerobic treatment region that treats water aerobically, a downstream region in which the water aerobically treated in the aerobic treatment region flows, a water quality sensor that is submerged in the downstream region and detects the water quality and a sensor washing arrangement that washes the water quality sensor by supplying the water of the downstream region to the water quality sensor at a flow rate higher than water flowing around the water quality sensor. As a result, sludge generated due to aerobic treatment can be prevented from being deposited on the water quality sensor and/or deposited sludge can be removed, so that the accuracy of water quality detection of the water quality sensor can be enhanced.

7 Claims, 5 Drawing Sheets

WATER TREATMENT APPARATUS AND METHOD

This is a continuation of U.S. patent application Ser. No. 11/594,970, filed Nov. 9, 2006, now U.S. Pat. No. 7,455,775.

BACKGROUND OF THE INVENTION

1. Field of the Invention

The present invention relates to a technique for treating water to be treated and more particularly, to an effective technique for washing a water quality sensor that detects the water quality.

2. Description of the Related Art

According to known water treatment apparatus for treating water, water quality is detected by using a water quality sensor. For example, Japanese laid-open patent publication No. 3-52696 discloses a water treatment apparatus of this type in which a DO sensor is provided in an aeration tank disposed upstream of a sterilizing tank in a submerged state. The quality of the aerated water can be kept track of by the DO sensor.

The water quality sensor is submerged in a purifying region to detect the water quality and therefore, an accuracy of water quality detection tends to be impaired by deposition of biomembrane on the sensor surface. In this connection, the water quality sensor is preferably installed particularly in a downstream region in which aerobically treated water flows. However, if the water quality sensor is installed downstream of the aerobic treatment region, sludge is generated due to aerobic treatment and deposited on the sensor surface. Therefore, it becomes difficult to enhance the accuracy of water quality detection to a desired level.

SUMMARY OF THE INVENTION

It is, accordingly, an object of the invention to provide an effective technique for detecting the quality of water with high accuracy.

A representative water treatment apparatus according to the present invention includes at least an aerobic treatment region, a downstream region, a water quality sensor and a sensor washing arrangement.

The aerobic treatment region according to the invention is designed as a region in which water is aerobically treated. The aerobic treatment is defined as a treatment of decomposing organic pollutant in the water to be treated by aerobic microbes in the presence of dissolved oxygen. The aerobic treatment region for such aerobic treatment may preferably be designed as a "contact filter bed tank" packed with contact materials on which biomembrane of aerobic microbes is deposited and with filter media for Filtration, or as a "carrier flow biofiltration tank" having movably packed carriers on which biomembrane of aerobic microbes is deposited.

The downstream region is designed as a region in which water aerobically treated in the aerobic treatment region flows. In the downstream region, the aerobically treated water may preferably be subjected to further purification or to transfer or storage. The aerobic treatment region and the downstream region may preferably be defined by dividing the water storage section by a partition or by the function even in the absence of the partition. For example, in a single treatment tank (treatment section), only an area in which dissolved oxygen exists due to air diffusion can be defined as the aerobic treatment region.

The water quality of the downstream region is detected by the water quality sensor that is submerged in the downstream region. The "water quality sensor" here may preferably includes a detecting part itself (sensor surface) that performs substantial water quality detection, or the detecting part plus a sensor housing for housing the detecting part. As the water quality detection sensor, various kinds of sensors can be appropriately used to detect data relating to the water quality, such as turbidity, transparency, SS (suspended solids), BOD (biochemical oxygen demand), DO (dissolved oxygen), pH, and UV (ultraviolet) absorbance of the water, continuously or at fixed time intervals.

Further, according to the invention, a sensor washing arrangement is provided for washing the water quality sensor. The sensor washing arrangement washes the water quality sensor by supplying the water of the downstream region to the water quality sensor at a flow rate higher than water flowing around the water quality sensor. The "washing" here may preferably include the manner of preventing deposition of sludge on the water quality sensor by the force of water and/or the manner of blowing away and removing sludge deposited on the water quality sensor by the force of water. This construction is rational in that water of the downstream region to be detected by the water quality sensor is used in itself for washing the water quality sensor without any another additional washing equipment.

By using such sensor washing arrangement, sludge generated due to aerobic treatment can be prevented from being deposited on the water quality sensor and/or deposited sludge can be removed, so that the accuracy of water quality detection of the water quality sensor can be enhanced. Further, such construction can dispense the need for providing a washing mechanism in the water quality sensor itself and is thus effective in simplifying the structure of the water quality sensor. The water of which flow rate is increased by the sensor washing arrangement may preferably be supplied to the water quality sensor continuously or intermittently (discontinuously).

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved water treatment apparatus and method for using such water treatment apparatus and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

An embodiment of the present invention will now be explained with reference to the drawings. This embodiment provides a water treatment apparatus for treating domestic wastewater.

FIRST REPRESENTATIVE EMBODIMENT

Figure 1:
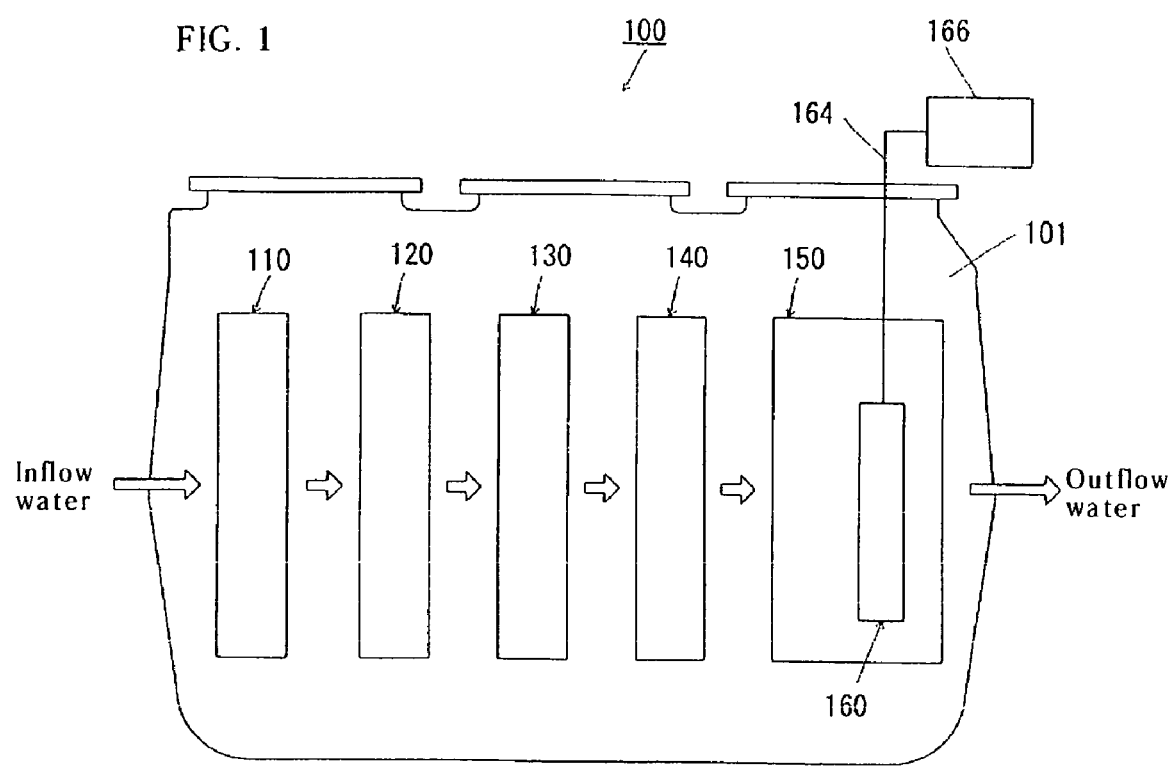
FIG. 1 schematically shows the construction of a water treatment apparatus 100 according to a first representative embodiment of the present invention.

FIG. 1 schematically shows the construction of a water treatment apparatus 100 according to a first embodiment of the present invention. As shown in FIG. 1, the water treatment apparatus 100 includes various purifying mechanisms within a tank body 101. Specifically, the tank body 101 houses, from the upstream side (left to right as viewed in FIG. 1) in order of the treatment procedures, a foreign matter removing tank 110, an anaerobic filter bed tank 120, a contact filter bed tank 130, a treated water tank 140 and a sterilizing tank 150. "Inflow water" in the form of wastewater flows into the tank body 101 and is purified within the foreign matter removing tank 110, the anaerobic filter bed tank 120, the contact filter bed tank 130, the treated water tank 140 and the sterilizing tank 150 successively. Thereafter, the treated water is discharged as "outflow water" to the outside of the tank body 101. In this embodiment, the "water to be treated" or "water" includes wastewater to flow from outside into the tank body 101, wastewater to be treated in each tank within the tank body 101 and water that flows in the process of treating the wastewater.

Foreign matter removing tank 110 is disposed in the most upstream portion of the tank body 101. Water to be treated flows into the foreign matter removing tank 110 through an inlet (not shown). Foreign matter in the water is separated from the water in the foreign matter removing tank 110 by means of a solid-liquid separating device such as an inflow baffle (not shown). The foreign matter removing tank 110 has a function of separating solid from liquid in the water to be treated. The water that has been treated in this foreign matter removing tank 110 is then transferred to the anaerobic filter bed tank 120 disposed downstream of the foreign matter removing tank 110.

Anaerobic filter bed tank 120 has a function of anaerobically treating (reducing) organic pollutant in the water to be treated. Typically, the anaerobic filter bed tank 120 is configured to have a filter bed packed with a predetermined amount of filter media. Anaerobic microbes are deposited on the filter media and anaerobically treat (reduce) organic pollutant in the water. Reduction of BOD and weight reduction of sludge can be attained by this anaerobic treatment. The treated water is thereafter transferred to the anaerobic filter bed tank 120 disposed downstream of the contact filter bed tank 130.

Contact filter bed tank 130 has a function of aerobically treating and filtering the water. In a path through which water to be treated flows, the contact filter bed tank 130 has a contact materials packed region packed with contact materials on which biomembrane of aerobic microbes is deposited, an air diffuser that supplies air to the contact materials in the contact materials packed region, and a filter media packed region packed with filter media for filtration. When air is supplied from the air diffuser, aerobic microbes deposited on the contact materials in the contact materials packed region contact the water to be treated, so that organic pollutant in the water to be treated is mainly aerobically treated (oxidized). The contact materials packed region of the contact filter bed tank 130 is a feature that corresponds to the "aerobic treatment region" according to this invention. Further, the treated water tank 140 and the sterilizing tank 150 which are disposed downstream of the aerobic treatment region or the contact filter bed tank 130 is a downstream region through which the water treated in the aerobic treatment region flows, and forms the "downstream region" in this invention.

Further, SS (suspended solids) within the water is filtered by the filter media in the filter media packed region. The water that has been treated in the contact filter bed tank 130 is transferred downstream to the treated water tank 140.

Treated water tank 140 has a function of temporally storing the water to be led into the sterilizing tank 150. The water temporally stored in the treated water tank 140 is transferred downstream to the sterilizing tank 150.

Sterilizing tank 150 has a function of sterilizing the water that has been led from the treated water tank 140. In this embodiment, the sterilizing tank 150 is positioned in the most downstream portion within the tank body 101. A chemical cartridge (a chemical cartridge 152 which will be described below with reference to FIG. 2) is disposed in the most upstream portion of the sterilizing tank 150 and filled with a solid chlorinating agent (antiseptic). The water that has been sterilized in this sterilizing tank 150 is discharged to the outside of the tank body 101. Specifically, the sterilizing tank 150 forms a sterilizing region for sterilizing the water aerobically treated in the aerobic treatment region or the contact filter bed tank 130, and is a feature that corresponds to the "sterilizing region" according to this invention.

In this embodiment, a water quality sensor 160 is submerged in a submerged region (a submerged region 151 which will be described below with reference to FIG. 2) of the sterilizing tank 150. The water quality sensor 160 has a function of detecting (also referred to as "measuring") the quality of sterilized water and has a detecting section (a detecting section 162 which will be described below with reference to FIG. 2) that is disposed within a sensor housing and substantially performs detection of the water quality. In this embodiment, the installation of the water quality sensor 160 in the sterilizing tank 150 in which the water aerobically treated in the contact filter bed tank 130 flows, is particularly effective in reducing deposition of biomembrane on the detecting section (the detecting section 162) of the water quality sensor 160. The water quality sensor 160 and the detecting section (detecting section 162) of the water quality sensor 160 respectively correspond to the "water quality detection sensor" according to this invention.

In this embodiment, the water quality sensor 160 typically comprises a optical turbidity measurement sensor (or transparency measurement sensor) employing a transmitted light system utilizing red light or near infrared radiation, or a scattered light system utilizing red light or near infrared radiation, in order to detect the turbidity (or transparency) of the sterilized water. Further, if the influence of the sterilizing treatment is considered, the sensor housing of the water quality sensor 160 may preferably comprise corrosion-resistant SUS (stainless steel) or resin material.

Figure 2:
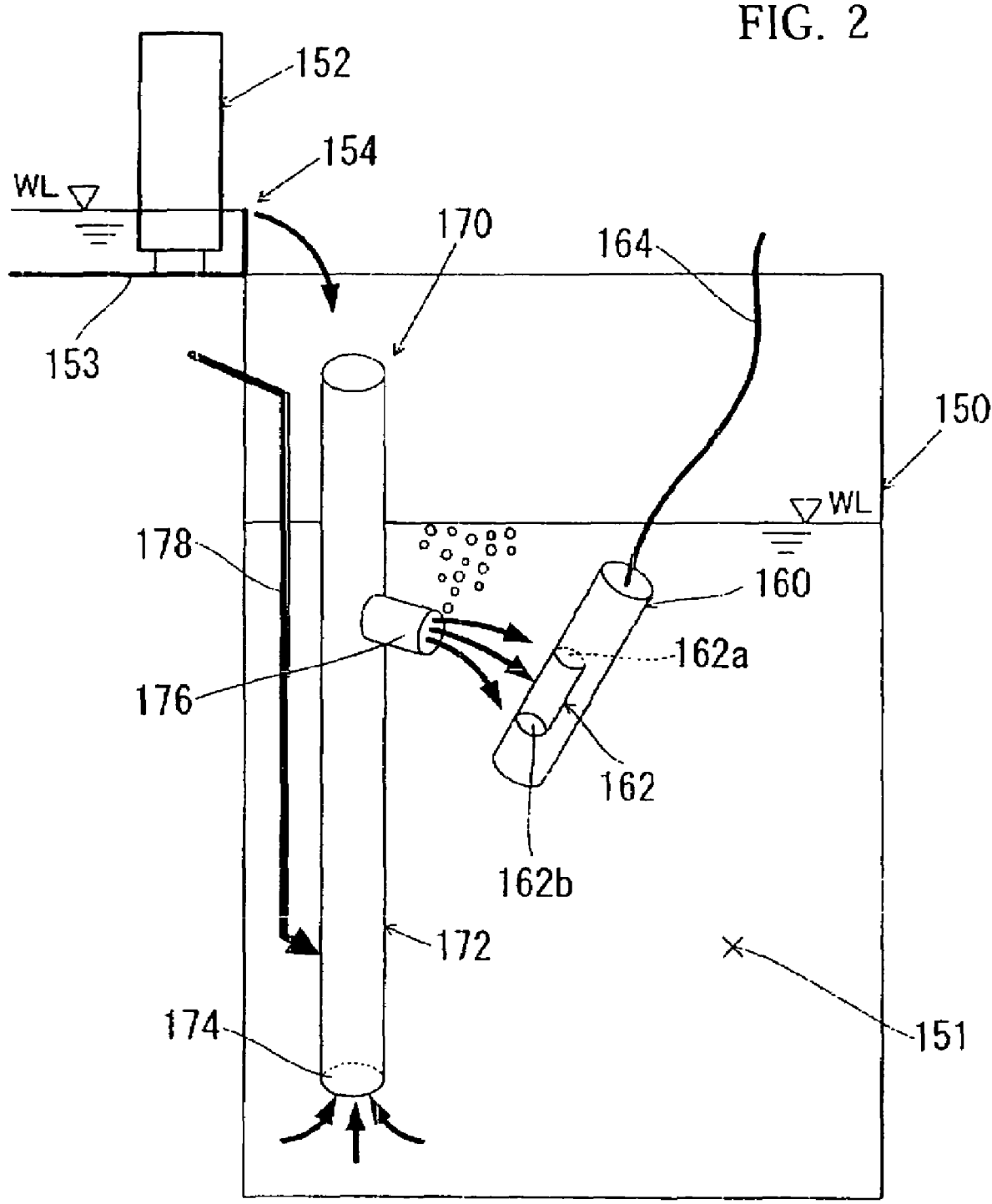
FIG. 2 shows a further detailed construction of a sterilizing tank 150 as shown in FIG. 1.

FIG. 2 shows a further detailed construction of the sterilizing tank 150 shown in FIG. 1. As shown, water containing chloride components is supplied from the chemical cartridge 152 into a tub 153 and stored in the tub 153. Thereafter, the water falls from the tub 153 through a discharge section 154 into the submerged region 151 in which the water quality sensor 160 is submerged.

In this submerged region 151, in addition to the water quality sensor 160, an air lift pump 170 is installed. The air lift pump 170 is designed specifically for cleaning the water quality sensor 160 and includes at least a pump body 172, a pump intake section 174, a pump discharge section 176 and an air supply section 178. The pump body 172 extends vertically in the tank. The pump intake section 174 is formed on the bottom of the pump body 172 and water in the submerged region 151 is pumped up through the pump intake section 174. The pump discharge section 176 is formed above the pump intake section 174 in the pump body 172, protrudes laterally from underwater and is designed as a part through which the water pumped up through the pump intake section 174 is discharged. When air is supplied from an air supply source such as a blower into the pump body 172 via the air supply section 178, air flows upward in the pump body 172 of the air lift pump 170. With such air flow, water in the submerged region 151 is pumped up through the pump intake section 174 and discharged through the pump discharge section 176.

Particularly in this embodiment, the relative position of the pump discharge section 176 of the air lift pump 170 and the water quality sensor 160 can be appropriately adjusted such that the pump water is discharged toward the detecting section 162 of the water quality sensor 160.

With this construction of the air lift pump 170, the water discharged from the pump discharge section 176 of the air lift pump 170 can be supplied to the detecting section 162 by the force of the discharged water at a flow rate higher than the water flowing around the detecting section 162 of the water quality sensor 160. As a result, the surface of the detecting section 162, or the sensor surface comprising a light emitting section 162a and a light receiving section 162b can be washed, so that deposition of sludge on the sensor surface can be prevented by the force of the discharged water, or sludge deposited on the sensor surface can be blown away and removed by the force of the discharged water. In this manner, the detecting section 162 can be washed while being kept from being contaminated. Specifically, in this embodiment, the discharge energy (kinetic energy) of the water discharged from the pump discharge section 176 of the air lift pump 170 can be utilized to wash the detecting section 162 or the sensor surface.

With this construction, contamination of the detecting section 162 can be prevented by the action of the water discharged from the pump discharge section 176 of the air lift pump 170 and allows the water quality sensor 160 to properly perform water quality detection. In this construction, the water of which flow rate is increased by the air lift pump 170 may be supplied to the detecting section 162 continuously or intermittently (discontinuously). Particularly with the construction in which the water having a flow rate increased by the air lift pump 170 is intermittently supplied to the detecting section 162, a higher effect of washing the detecting section 162 can be obtained. Further, this construction is rational in that the water in the submerged region 151 (the sterilizing tank 150) to be detected by the detecting section 162 is used in itself for washing the detecting section 162. The air lift pump 170 is a feature that corresponds to the "sensor washing arrangement" and the "pumping device" according to this invention.

Further, with this construction of the air lift pump 170, water within the sterilizing tank 150 is stirred by the force of the water discharged from the pump discharge section 176. As a result, the water quality within the sterilizing tank 150 can be homogenized, so that the water quality sensor 160 can perform stable water quality measurement. Further, in order to enhance the stirring effect of the water discharged from the pump discharge section 176, as necessary, a baffle or the like may be appropriately installed within the sterilizing tank 150.

Further, with regard to the construction of the water quality sensor 160 in this embodiment, preferably, the sensor surface of the detecting section 162 is oriented to extend in a direction crossing the direction of discharge of the water to be discharged from the pump discharge section 176. In this construction, the orientation of the sensor surface of the water quality sensor 160 may be adjusted according to the direction of discharge from the pump discharge section 176, or vice versa. With this construction, the discharge energy of the water discharged from the pump discharge section 176 can be efficiently caused to act upon the sensor surface of the detecting section 162, so that the detecting section 162 can be washed by stronger water force.

Further, the water quality sensor 160 in this embodiment is preferably constructed such that the sensor surface of the detecting section 162 is smoothed. The smoothing of the sensor surface can be achieved by smoothing the sensor surface itself, or by covering the sensor surface with a coating or by applying a film having a high smoothness to the sensor surface. Further, in the water quality sensor 160 in this embodiment, preferably, the sensor surface may comprise translucent materials having a smooth surface, such as glass or sapphire glass, or other translucent materials (such as acrylic resin). With such construction, the transmittance of the water quality sensor 160 is ensured so that the detecting performance is maintained. In addition, the sensor surface is smoothed so that deposition of sludge on the detecting section 162 can be reduced. Therefore, in cooperation with the force of the water discharged from the pump discharge section 176 of the air lift pump 170, such construction can further enhance the effect of washing the detecting section 162. Particularly by using sapphire glass for the sensor surface, the sensor surface can be rendered more scratch resistant compared with that of glass. Further, by using acrylic resin for the sensor surface, the construction can be cheaper compared with that of glass.

Further, as an alternative or in addition to such smoothing, the sensor surface may be fluorinated or covered with a photocatalytic coating. As for fluorination, a surface preparation agent containing fluorocarbon polymer is applied to the sensor surface. Thus, the water or oil repellency of the sensor surface can be enhanced, so that deposition of sludge on the detecting section 162 can be reduced. As for a photocatalytic coating, the sensor surface is covered with a titanium oxide film and the titanium oxide film is subjected to light. As a result, oxidative decomposition of sludge and superhydrophilic action of lifting the dirt and washing it away can be caused, so that deposition of sludge on the detecting section 162 can be reduced. In this case, preferably, the surface preparation agent and the titanium oxide film are transparent and colorless so as to hardly influence the optical characteristics.

Further, with regard to the construction of the water quality sensor 160 in this embodiment, in order to detect the standard quality of sterilized water with high accuracy, in consideration of precipitated sludge that is precipitated in the bottom of the sterilizing tank 150, or suspended sludge that is suspended in the water surface in the tank top, preferably, the detecting section 162 of the water quality sensor 160 is disposed between the precipitated sludge region and the suspended sludge region within the submerged region 151 of the sterilizing tank 150 in its vertical direction. With this construction, influence of precipitated sludge and suspended sludge on the water quality detection (measurement) of the water quality sensor 160 can be avoided. Thus, the standard quality of sterilized water can be detected with stability and high accuracy.

Further, with regard to the construction of the water quality sensor 160 in this embodiment, the water quality sensor 160 may preferably be oriented such that precipitated sludge is not easily precipitated on the detecting section 162, in consideration of the configuration and structure of the detecting section 162. For example, if the sensor surface of the detecting section 162 is flat, the water quality sensor 160 may be installed in the orientation in which the sensor surface extends vertically. Thus, the sludge that has been precipitated downward in the water is not easily deposited on the detecting section 162 of the water quality sensor 160, so that a stable water quality measurement can be achieved with the water quality sensor 160.

Bubbles (air) flow up within the pump body 172 and is discharged to the outside of the pump through the pump discharge section 176. Preferably, the air lift pump 170 of this embodiment is constructed such that the discharged bubbles move upward directly toward the tank top in such a manner as to avoid contact with the detecting section 162 as shown in FIG. 2. Such contact avoidance can be achieved by appropriately adjusting the distance between the pump discharge section 176 of the air lift pump 170 and the detecting section 162 of the water quality sensor 160. Specifically, the distance between the pump discharge section 176 and the detecting section 162 can be adjusted such that the flow of water discharged from the pump discharge section 176 reaches the detecting section 162 while the bubbles discharged from the pump discharge section 176 do not contact the detecting section 162. With this construction, occurrence of variations in the detected value of the water quality sensor 160 can be prevented.

Further, with regard to the construction of the air lift pump 170 of this embodiment, the pump discharge section 176 can be appropriately located under, around or over the water surface, and particularly preferably, under or around the water surface. With this construction, compared with the case in which the pump discharge section 176 is arranged over the water surface, the use of air for pump transfer of water by the air lift pump 170 can be reduced by reducing the pump head.

The data detected continuously or at fixed time intervals by the water quality sensor 160 are outputted to an output section 166 by means of indication or voice via a cable 164. Thus, the quality of the water sterilized in the sterilizing tank 150 or the water to be discharged to the outside of the tank body 101 can be controlled. Specifically, an indicator or an alarm is installed on or around the water treatment apparatus 100 itself. The indicator displays the data, or the alarm notifies that the water quality is not within the predetermined range of level, if such occurs. Alternatively or in addition, the detected data of the water quality sensor 160 is appropriately transmitted by wire or radio channel via a terminal (not shown) to a data monitor (data management system) or data processor which is installed in a position remote from the water treatment apparatus 100.

It is known that water turbidity (or transparency) is generally correlated with BOD (biochemical oxygen demand) and SS (suspended solids). In this embodiment, it is constructed such that quantitative or qualitative analysis of water quality can be performed in relation to BOD and SS by obtaining detected turbidity (or transparency) data. At this time, the water quality detection sensor 160 may be constructed such that the detected turbidity (or transparency) data itself is outputted as-is to the output section 166, or such that the detected turbidity (or transparency) data is converted into data relating to BOD or SS and the converted date is outputted to the output section 166.

Further, in this embodiment, the water quality detection sensor 160 is used to keep track of the sterilizing performance of the sterilizing tank 150 as well as the water quality detection as mentioned above. If the sterilizing performance deteriorates, biomembrane will be deposited on the detecting section 162 of the water quality sensor 160, resulting in that the detected value of the water quality sensor 160 falls outside the normal range. Therefore, by monitoring the detected data, it can be found that the sterilizing performance has deteriorated, for example, due to shortage of the chlorinating agent. Thus, the water quality sensor 160 of this embodiment not only serves as a means for detecting the quality of water of the sterilizing tank 150, but also as a means for detecting that biomembrane has been deposited on the detecting section of the water quality sensor 160 due to deterioration of the sterilizing performance of the sterilizing tank 150.

Figure 3:
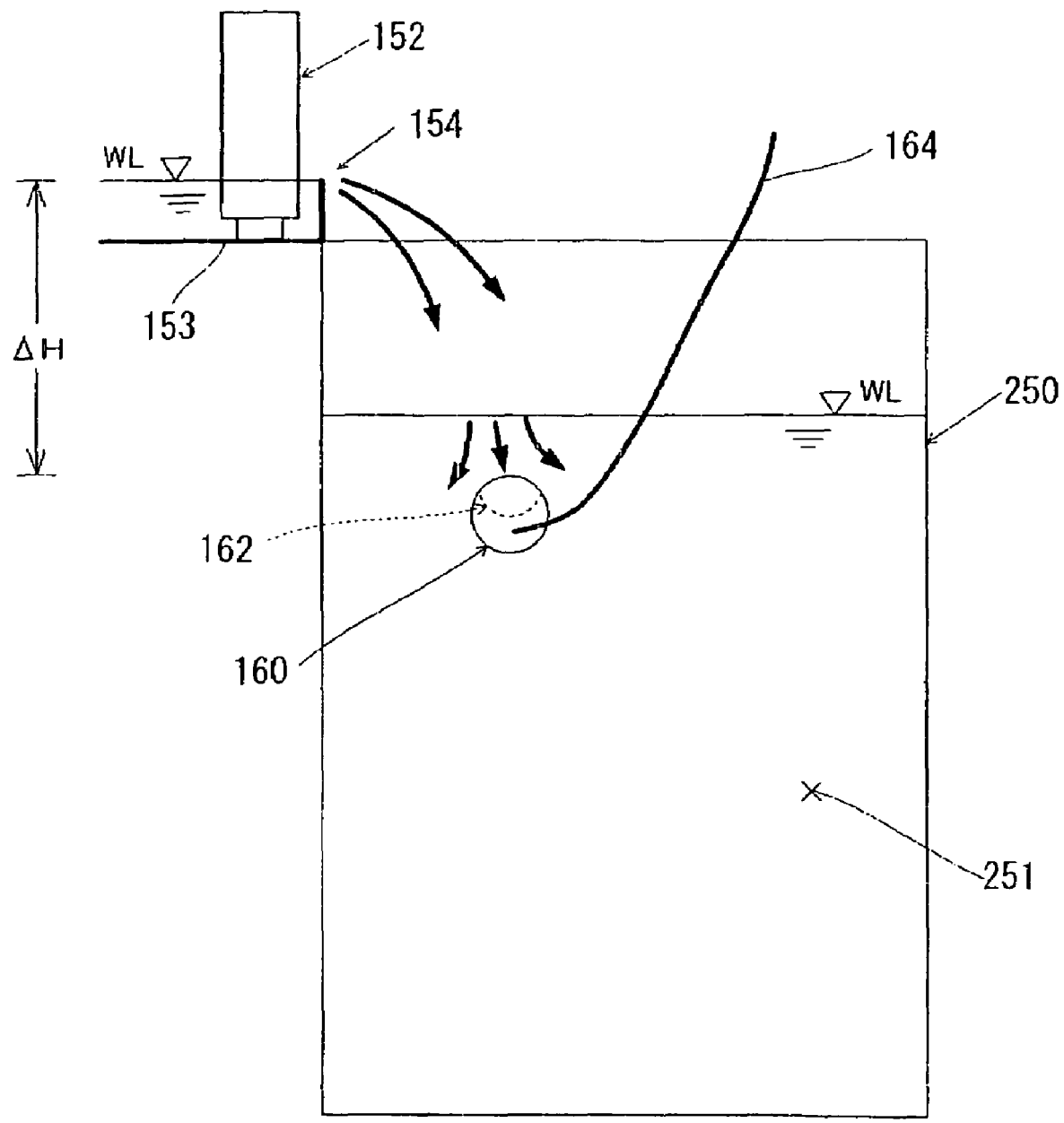
FIG. 3 shows a detailed construction of a sterilizing tank 250 as an alternative to the sterilizing tank 150 as shown in FIG. 1.

In the water treatment apparatus 100 in this embodiment, a sterilizing tank of different construction can be used in place of the sterilizing tank 150. FIG. 3 shows a detailed construction of a sterilizing tank 250 as an alternative to the sterilizing tank 150 shown in FIG. 1.

In the sterilizing tank 250 shown in FIG. 3, the washing treatment of the water quality sensor 160 is achieved, without using the air lift pump 170, by utilizing the force of water to be dropped from the discharge section 154 of the tub 153 in which the chemical cartridge 152 is disposed, into a submerged region 251 in which the water quality sensor 160 is submerged. Specifically, the detecting section 162 of the water quality sensor 160 is positioned under the water surface in a location within the submerged region 251 where the water discharged from the discharge section 154 falls. Further, a drop $\Delta H$ is provided between the discharge section 154 and the water quality sensor 160 such that the discharge height of the discharge section 154 is higher than the installation height of the water quality sensor 160. The water discharged from the discharge section 154 can be supplied to the detecting section 162 by the force of the discharged water falling toward the detecting section 162 of the water quality sensor 160 at a flow rate higher than the water flowing around the detecting section 162 of the water quality sensor 160. As a result, deposition of sludge on the sensor surface (the light emitting section 162a and the light receiving section 162b) can be prevented by the force of the discharged water, or sludge deposited on the sensor surface can be blown away and removed by the force of the discharged water. In this matter, the detecting section 162 can be washed. Specifically, in this embodiment, the falling energy (potential energy) of the water discharged and falling from the discharge section 154 can be utilized to wash the sensor surface (the surface to be washed) of the detecting section 162.

With this construction, the water quality sensor 160 is allowed to properly perform water quality detection by prevention of contamination of the detecting section 162 by the falling action of the water discharged from the discharge section 154. In this construction, the water of which flow rate is increased by the falling action of the water discharged from the discharge section 154 may be supplied to the detecting section 162 continuously or intermittently. Particularly with the construction in which the water having an increased flow rate by the falling action of the water discharged from the discharge section 154 is intermittently supplied to the detecting section 162, a higher effect of washing the detecting section 162 can be obtained. Further, this construction is rational in that sterilized water itself to be detected by the detecting section 162 is used for washing the detecting section 162. The construction in which the water discharged from the discharge section 154 falls toward the detecting section 162 of the water quality sensor 160 forms the "sensor washing system" according to this invention.

Further, with regard to the construction of the water quality sensor 160 in this embodiment, preferably, the sensor surface of the detecting section 162 is oriented to extend in a direction crossing the direction of discharge (drop) of the water from the discharge section 154. In this construction, the orientation of the sensor surface of the water quality sensor 160 may be adjusted according to the direction of discharge from the discharge section 154, or vice versa. With this construction, the falling energy of the water discharged and falling from the discharge section 154 can be efficiently caused to act upon the sensor surface of the detecting section 162, so that the detecting section 162 can be washed by stronger water force.

As described above, according to the construction of the water treatment apparatus 100 and the water treatment method using the water treatment apparatus 100 in the first embodiment, the detecting section 162 of the water quality sensor 160 can be reliably washed by utilizing the force of water discharged from the pump discharge section 176 of the air lift pump 170, or the force of water discharged and falling from the discharge section 154 of the tub 153. Thus, the water quality sensor 160 can attain higher accuracy of water quality detection. Further, sludge contained in sterilized water has lower adhesion than that in unsterilized water and is thus less sticky or viscous and resistant to adhesion to the water quality sensor. Therefore, sludge or any other deposits can be further reliably prevented from being deposited on the detecting section 162 of the water quality sensor 160 submerged in the sterilizing tank 150. Further, the construction which uses water force to wash the detecting section 162 of the water quality sensor 160 can dispense the need for providing a washing mechanism in the water quality sensor 160 itself and is thus effective in simplifying the structure of the water quality sensor 160.

Further, according to the water treatment apparatus 100, not only the quality of water flowing within the tank body 101 but the quality of water to be discharged to the outside of the tank body 101 can be accurately and constantly monitored. Particularly, as for domestic water treatment apparatus for treating domestic wastewater, maintenance is less frequently performed (for example, every four months) compared with those for industrial use. It is therefore highly desired to monitor the water quality until the next maintenance is performed. Therefore, like in this invention, by constantly monitoring the quality of water to be discharged to the outside of the tank body 101 by using the water quality sensor 160, it is made possible to keep track of the performance of the water treatment apparatus 100 and to promptly cope with deterioration of the performance if any. Thus, the quality of water to be discharged to the outside of the tank body 101 can be maintained and controlled into a desired state. Therefore, an environmentally friendly water quality control can be realized.

Further, as described above, the water quality sensor 160 is used as a means for detecting the water quality within the sterilizing tank 150 and also as a means for detecting biomembrane deposition on the detecting section 162 of the water quality sensor 160. Therefore, the water quality sensor 160 can be used to monitor the water quality of the water storing section and also to monitor the sterilizing performance. Thus, an efficient water quality control can be realized.

SECOND REPRESENTATIVE EMBODIMENT

Figure 4:
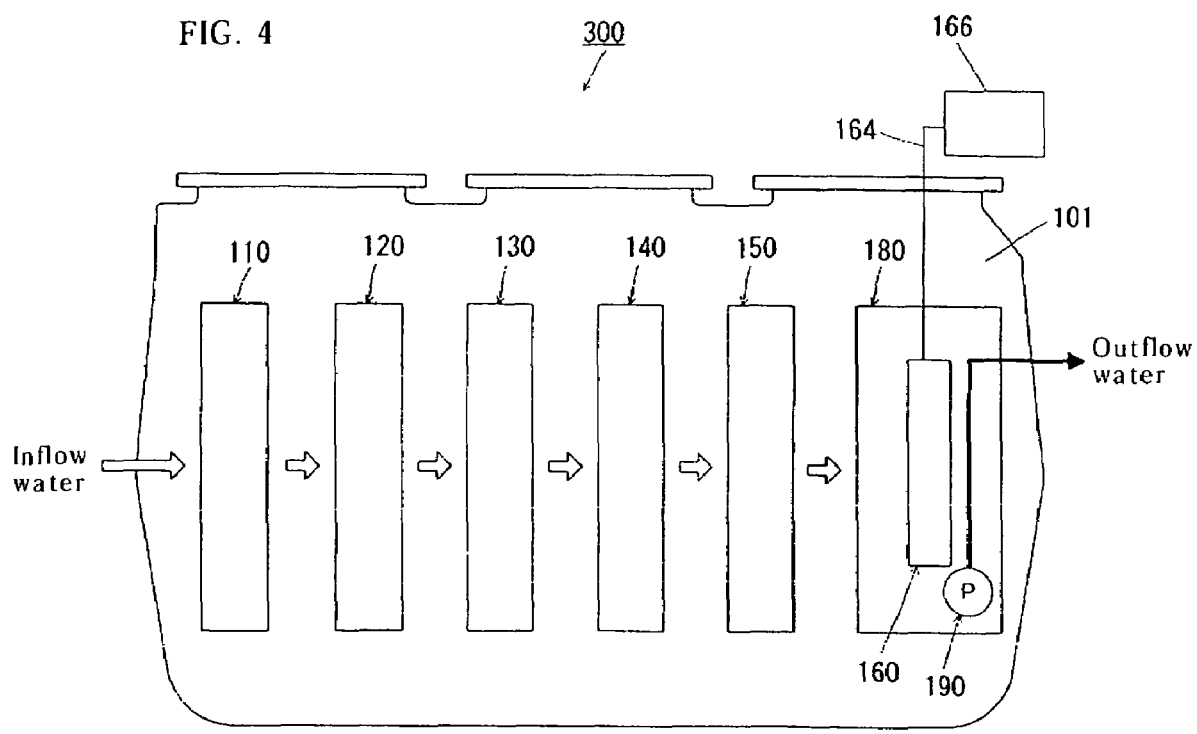
FIG. 4 schematically shows the construction of a water treatment apparatus 30Q according to a second representative embodiment of the present invention.

FIG. 4 schematically shows the construction of a water treatment apparatus 300 according to a second embodiment of the present invention. As shown in FIG. 4, in addition to the same purifying mechanisms as the water treatment apparatus 100 of the first embodiment (the foreign matter removing tank 110, the anaerobic filter bed tank 120, the contact filter bed tank 130, the treated water tank 140 and the sterilizing tank 150 or 250), the water treatment apparatus 300 further includes a discharge pump tank 180 within the tank body 101. The discharge pump tank 180 may be housed in the tank body 101 in which the other purifying mechanisms are housed, or may be formed as a tank separate from the tank body 101.

Discharge pump tank 180 is disposed downstream of the sterilizing tank 150 and has a function of temporally storing the water sterilized in the sterilizing tank 150 and then discharging it to the outside of the tank body 101. The discharge pump tank 180 is disposed downstream of the aerobic treatment region or the contact filter bed tank 130 and is a downstream region through which the water treated in the aerobic treatment region flows, and forms the "downstream region" in this invention. In this embodiment, the same water quality sensor 160 as used in the sterilizing tank 150 or 250 of the water treatment apparatus 100 is installed in the discharge pump tank 180. Therefore, detailed explanation of the water quality sensor 160 will be omitted. In this embodiment, installation of the water quality sensor 160 in the discharge pump tank 180 in which the water aerobically treated in the contact filter bed tank 130 flows is particularly effective in reducing deposition of biomembrane on the detecting section (the detecting section 162) of the water quality sensor 160.

Figure 5:
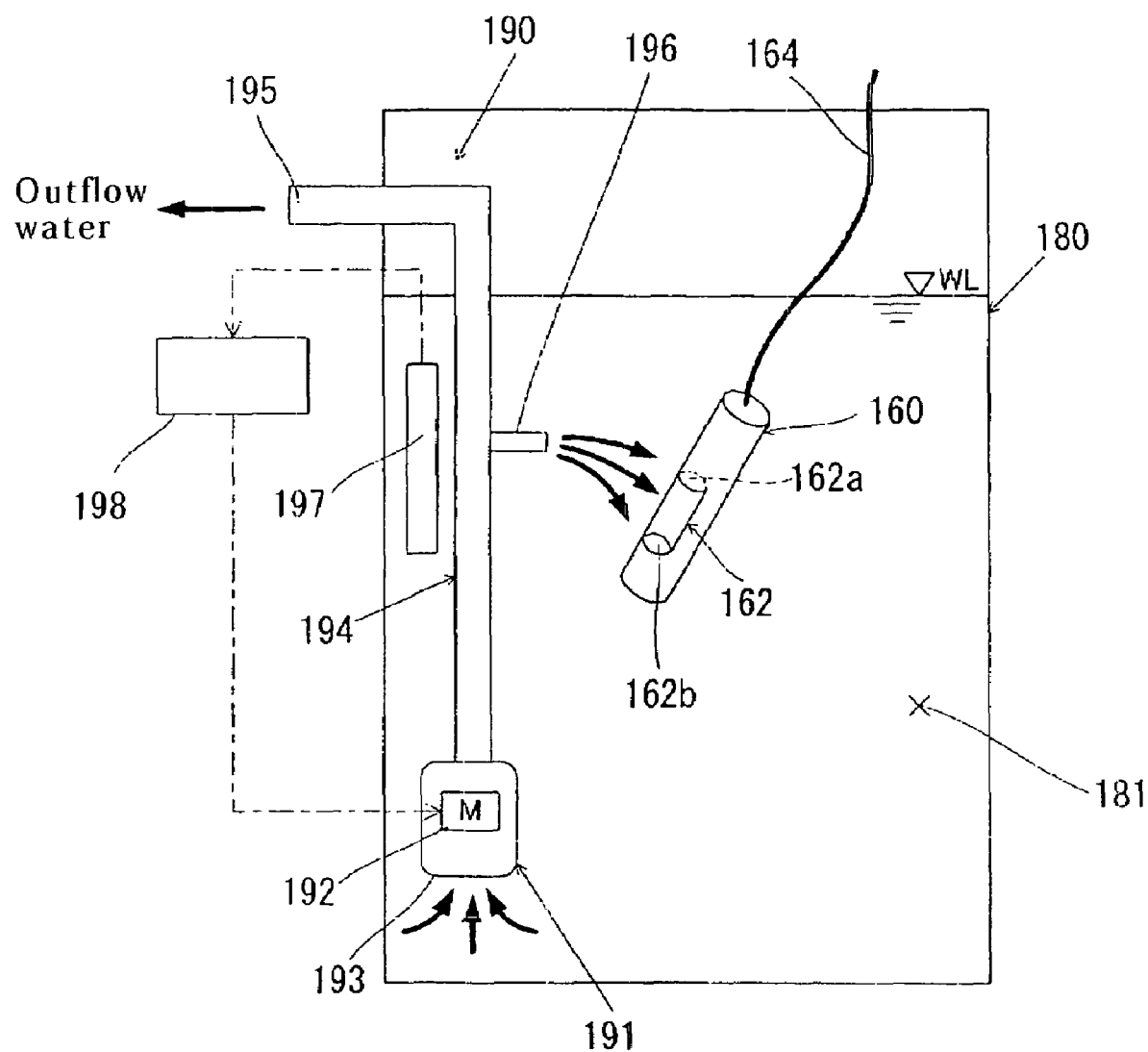
FIG. 5 shows a further detailed construction of a discharge pump tank 180 as shown in FIG. 4.

FIG. 5 shows a further detailed construction of the discharge pump tank 180 shown in FIG. 4. As shown, the discharge pump 190 is disposed in a submerged region 181 of the discharge pump tank 180 together with the water quality sensor 160 and designed as a "submerged pump" installed with a pump body 191 of the discharge pump 190 submerged in the tank. A motor 192 for driving a pump mechanism is disposed within the pump body 191 of the discharge pump 190. When the pump mechanism is driven by the motor 192, water is pumped up from a pump intake section 193, led through a vertically extending transfer tube 194 and then discharged from a pump discharge section 195. The motor 192 is designed to be controlled by a controller 198 based on the detected data of the water level of the submerged region 181 which is detected by a water lever detection sensor 197. The controller 198 may be designed exclusively for controlling the amount of pump discharge of the discharge pump 190, or may be designed for controlling the entire spectrum of the water treatment apparatus 100 as well as the pump discharge. Further, as the water lever detection sensor 197, a float type level sensor, a differential pressure type level sensor, ultrasonic or infrared level sensor may be appropriately used.

With regard to the specific control of the motor 192, a construction of switching between drive control and stop control of the motor 192 according to the water level and the water level change of the submerged region 181, and a construction of increasing and decreasing the motor revolutions of the motor 192 according to the water level and the water level change of the submerged region 181, are appropriately used. For example, first and second constructions may be used. The first construction controls the motor 192 to be driven at certain revolutions only when the water level of the submerged region 181 exceeds a reference level, while controlling the motor 192 to be stopped when the water level is lowered below the reference level. The second construction controls the motor revolutions of the motor 192 to vary such that the water level of the submerged region 181 is adjusted to the neighborhood of the reference level. With this construction, the amount of water to be discharged from the discharge pump tank 180 can be varied according to the operating duty of the treatment regions located upstream of the discharge pump tank 180 (the submerged region 181) in which the water quality sensor 160 is installed.

Particularly, the discharge pump 190 of this embodiment has a function of discharging the water stored in the discharge pump tank 180, by pump transfer, and also a function of washing the water quality sensor 160. Specifically, a branch pipe 196 is provided on the transfer tube 194 and extends laterally from the transfer tube 194. The branch pipe 196 branches part of the water pumped up through the pump intake section 193. In this embodiment, the relative position of the branch pipe 196 of the discharge pump 190 and the water quality sensor 160 can be appropriately adjusted such that the pump water is discharged from the branch pipe 196 toward the detecting section 162 of the water quality sensor 160.

The water discharged from the branch pipe 196 of the discharge pump 190 can be supplied to the detecting section 162 by the force (flow) of the discharged water at a flow rate higher than the water flowing around the detecting section 162. As a result, deposition of sludge on the sensor surface can be prevented by the force of the discharged water, or sludge deposited on the sensor surface can be blown away and removed by the force of the discharged water. In this manner, the detecting section 162 can be washed while being kept from being contaminated. Specifically, in this embodiment, the discharge energy (kinetic energy) of the water discharged from the branch pipe 196 of the discharge pump 190 can be utilized to wash the sensor surface (the surface to be washed) of the detecting section 162.

With this construction, contamination of the detecting section 162 can be prevented by the action of the water discharged from the branch pipe 196 of the discharge pump 190 allowing the water quality sensor 160 to properly perform water quality detection. In this construction, the water of which flow rate is increased by the discharge pump 190 may be supplied to the detecting section 162 continuously or intermittently. Particularly with the construction in which the water having a flow rate increased by the discharge pump 190 is intermittently supplied to the detecting section 162, a higher effect of washing the detecting section 162 can be obtained. Further, this construction is rational in that the water in the submerged region 181 (the discharge pump tank 180) to be detected by the detecting section 162 is used in itself for washing the detecting section 162. The discharge pump 190 is a feature that corresponds to the "sensor washing arrangement" and the "pumping device" according to this invention. Further, the pump intake section 193 and the branch pipe 196 of the discharge pump 190 are features that correspond to the "pump intake section" and the "pump discharge section", respectively, according to this invention.

Further, water within the discharge pump tank 180 is stirred by the force of the water discharged from the branch pipe 196. As a result, the water quality within the discharge pump tank 180 can be homogenized, so that the water quality sensor 160 can perform stable water quality measurement. Further, in order to enhance the stirring effect of the water discharged from the branch pipe 196, a baffle or the like may be appropriately installed within the discharge pump tank 180, as necessary.

Further, the amount of water to be discharged from the discharge pump tank 180 can be varied according to the operating duty of the treatment regions located upstream of the discharge pump tank 180 (the submerged region 181) in which the water quality sensor 160 is installed. Thus, the amount of water to be discharged from the branch pipe 196 can also be varied according to the operating duty of the upstream regions. This operating duty can be kept track of from the amount or the change of the amount of water flowing in the treatment regions located upstream of the installation location of the water quality sensor 160 and from the water level or the change of the water level of the treatment regions. Inflow of sludge which may possibly be deposited on the detecting section 162 of the water quality sensor 160 is assumed to increase as the operating duty increases.

Therefore, according to this embodiment, if the inflow of sludge which may cause contamination of the detecting section 162 increases in the discharge pump tank 180 as the inflow of water into the discharge pump tank 180 increases, the discharge of water to be discharged from the branch pipe 196 can be increased by that much, so that the effect of washing the detecting section 162 can be enhanced. By such control, the detecting section 162 can be washed in an efficient manner in accordance with the amount of sludge inflow.

Further, with regard to the water quality sensor 160, the sensor surface of the detecting section 162 may preferably be oriented to extend in a direction crossing the direction of discharge of the water to be discharged from the branch pipe 196. In this construction, the orientation of the sensor surface of the water quality sensor 160 may be adjusted according to the direction of discharge from the pump discharge section 176, or vice versa. With this construction, the discharge energy of the water discharged from the branch pipe 196 can be efficiently caused to act upon the sensor surface of the detecting section 162, so that the detecting section 162 can be washed by stronger water force.

Further, with regard to the construction of the discharge pump tank 180 in this embodiment, instead of using the discharge pump 190 both for water discharge and for sensor washing, the discharge pump 190 may be used exclusively for water discharge. In this case, the washing mechanism using the air lift pump 170 or the washing mechanism using water discharged from the discharge section 154 in the water treatment apparatus 100 according to the first embodiment may be used to wash the water quality sensor 160.

As described above, according to the water treatment apparatus 300 in the second embodiment, the same effect can be obtained as the first embodiment. Particularly, the detecting section 162 of the water quality sensor 160 can be reliably washed by utilizing the force of water discharged from the branch pipe 196 of the discharge pump 190 in the discharge pump tank 180. Thus, the water quality sensor 160 can attain higher accuracy of water quality detection. Further, sludge contained in sterilized water has lower adhesion than that in unsterilized water and is thus less sticky or viscous and resistant to adhesion to the water quality sensor. Therefore, sludge or any other deposits can be further reliably prevented from being deposited on the detecting section 162 of the water quality sensor 160 submerged in the discharge pump tank 180.

This invention is not limited to the above-mentioned embodiments, but various applications or modifications may be made. For example, the following embodiments may be provided by application of the above-mentioned embodiment.

In the above-mentioned embodiment, the detecting section 162 is washed by using the construction in which water is pumped up by the air lift pump or the submerged pump and discharged toward the detecting section 162 of the water quality sensor 160, or the construction in which water is caused to fall from a height above the detecting section 162 of the water quality sensor 160 toward the detecting section 162. However, in this invention, other washing mechanisms may be used. For example, a movable member (such as a blade member) may be caused to rotate or reciprocate toward the detecting section 162 in the water in order to increase the flow rate of the water flowing around the detecting section 162 of the water quality sensor 160 and wash the detecting section 162.

Further, in the above-mentioned embodiment, a solid chlorinating agent is used for sterilization of the sterilizing tank 150. However, instead of chlorination, other sterilizing methods, such as ozone sterilization, UV (ultraviolet) sterilization and electrolytic sterilization, may be appropriately employed.

Further, in the above-mentioned embodiment, turbidity (or transparency), a kind of water quality, is detected by using the water quality sensor 160. However, in addition to or instead of turbidity (or transparency), it may be constructed such that the water quality can be detected in terms of SS, BOD, DO or pH.

Further, in the above-mentioned embodiment, the air lift pump 170 is used exclusively for washing the water quality sensor 160. However, the pump discharge section of the air lift pump or submerged pump which transfers water in other location may branch and lead part of the water to be discharged toward the water quality sensor so that the water quality sensor 160 can be washed. In this case, the air lift pump or the submerged pump may be installed in the sae region as or in a different region from the submerged region of the water quality sensor. Further, in this invention, water flowing upstream or water flowing downstream of the submerged position of the water quality sensor may be used for washing the water quality sensor.

Further, the present invention is applied to the water treatment apparatus 100 having the foreign matter removing tank 110, the anaerobic filter bed tank 120, the contact filter bed tank 130, the treated water tank 140 and the sterilizing tank 150 within the tank body 101, or to the water treatment apparatus 300 having the foreign matter removing tank 110, the anaerobic filter bed tank 120, the contact filter bed tank 130, the treated water tank 140, the sterilizing tank 150 and the discharge pump tank 180 within the tank body 101. However, this invention can also be applied to a water treatment apparatus having at least an aerobic treatment region in which water is aerobically treated and a downstream region in which the water treated in the aerobic treatment region flows. In this invention, as the aerobic treatment region, a carrier flow biofiltration tank having movably packed carriers on which biomembrane of aerobic microbes is deposited, or an aerobic digestion tank in which sludge is aerobically digested may be used as well as a treatment tank such as the contact filter bed tank 130 of this embodiment. Further, in this invention, the downstream region may comprise a sterilizing tank for sterilizing water, or a storage tank for temporally storing the sterilized water before discharged.

Further, this invention can also be applied likewise to various industrial wastewater treatment apparatus.

DESCRIPTION OF NUMERALS

100, 300 wastewater treatment apparatus
101 tank body
110 foreign matter removing tank
120 anaerobic filter bed tank
130 contact filter bed tank
140 treated water tank
150, 250 sterilizing tank
151, 181, 251 submerged region
152 chemical cartridge
153 tub
154 discharge section
160 water quality sensor
162 detecting section
162a light emitting section
162b light receiving section
164 cable
166 output section
170 air lift pump
172 pump body
174 pump intake section
176 pump discharge section
178 air supply section
180 discharge pump tank
190 discharge pump
191 pump body
192 motor
193 pump intake section
194 transfer tube
195 pump discharge section
196 branch pipe
197 water level sensor
198 controller

What we claim is:

1. A water treatment apparatus comprising:
   an aerobic treatment region that treats water aerobically,
   a sterilizing region in which the water aerobically treated in the aerobic treatment region flows and is sterilized,
   a water quality sensor that is submerged in the sterilizing region and detects the water quality, and
   a sensor washing arrangement submerged in the sterilizing region that washes the water quality sensor by supplying the water of the sterilizing region to the water quality sensor at a flow rate higher than water flowing around the water quality sensor.

2. The water treatment apparatus as defined in claim 1, wherein the sensor washing arrangement includes a discharge section from which the water in the sterilizing region is discharged toward the water quality sensor, wherein a drop is provided between the discharge section and the water quality sensor such that the discharge height of the discharge section is higher than the installation height of the water quality sensor, and wherein the water discharged from the discharge section is supplied to the water quality sensor by the force of the discharged water falling toward the water quality sensor at a flow rate higher than water flowing around the water quality sensor.

3. The water treatment apparatus as defined in claim 1, wherein the sensor washing arrangement comprises a pumping device that pumps up water of the downstream region through a pump intake section and discharges the water through a pump discharge section toward the water quality sensor and wherein the sensor washing arrangement supplies the water discharged through the pump discharge section to the water quality sensor by the force of the water discharged toward the water quality sensor at a flow rate higher than water flowing around the water quality sensor.

4. The water treatment apparatus as defined in claim 1, wherein the sensor washing arrangement includes a controller that varies the amount of water to be discharged from the pump discharge section toward the water quality sensor according to the operating duty of treatment regions located upstream of the installation location of the water quality sensor.

5. The water treatment apparatus as defined in claim 2, wherein a sensor surface of the water quality sensor is oriented to extend in a direction crossing the direction of discharge of the water to be discharged from the discharge section or the pump discharge section.

6. The water treatment apparatus as defined in claim 1, wherein the sensor surface of the water quality sensor is smoothed.

7. A water treatment method using a water treatment apparatus including an aerobic treatment region in which water is aerobically treated, a sterilizing region in which the water treated in the aerobic treatment region flows and is sterilized, and a water quality sensor that is submerged in the sterilizing region and detects the water quality, wherein:

water in the sterilizing region is supplied to the water quality sensor at a flow rate higher than water flowing around the water quality sensor in order to wash the water quality sensor by preventing deposition onto the water quality sensor or removing deposits on the water quality sensor.

\* \* \* \* \*